United States Patent
Flores et al.

(10) Patent No.: US 7,694,000 B2
(45) Date of Patent: Apr. 6, 2010

(54) CONTEXT SENSITIVE PORTLETS

(75) Inventors: Romelia H. Flores, Keller, TX (US); Biao Hao, Bedford, TX (US)

(73) Assignee: International Business Machines Corporation, Armonk, NY (US)

( * ) Notice: Subject to any disclaimer, the term of this patent is extended or adjusted under 35 U.S.C. 154(b) by 1111 days.

(21) Appl. No.: 10/420,684

(22) Filed: Apr. 22, 2003

(65) Prior Publication Data

US 2005/0021765 A1  Jan. 27, 2005

(51) Int. Cl.
 *G06F 15/16* (2006.01)
(52) U.S. Cl. .................. 709/228; 709/217; 709/220; 715/805; 715/806
(58) Field of Classification Search .......... 709/220, 709/228, 217; 715/805, 806
 See application file for complete search history.

(56) References Cited

U.S. PATENT DOCUMENTS

| | | | |
|---|---|---|---|
| 2002/0165721 A1* | 11/2002 | Chang | 704/503 |
| 2002/0169852 A1* | 11/2002 | Schaeck | 709/218 |
| 2003/0040921 A1* | 2/2003 | Hughes et al. | 705/1 |
| 2003/0065706 A1* | 4/2003 | Smyth et al. | 709/200 |
| 2003/0117437 A1* | 6/2003 | Cook et al. | 345/764 |
| 2003/0121983 A1* | 7/2003 | Herle | 235/472.01 |
| 2003/0126558 A1* | 7/2003 | Griffin | 715/513 |
| 2003/0137538 A1* | 7/2003 | Hesmer et al. | 345/760 |
| 2004/0010598 A1* | 1/2004 | Bales et al. | 709/228 |
| 2004/0068568 A1* | 4/2004 | Griffin et al. | 709/227 |
| 2004/0090969 A1* | 5/2004 | Jerrard-Dunne et al. | 370/395.54 |
| 2004/0098467 A1* | 5/2004 | Dewey et al. | 709/219 |
| 2004/0183831 A1* | 9/2004 | Ritchy et al. | 345/762 |
| 2004/0205555 A1* | 10/2004 | Hind et al. | 715/513 |
| 2004/0230557 A1* | 11/2004 | Bales et al. | 707/1 |

* cited by examiner

*Primary Examiner*—Saleh Najjar
*Assistant Examiner*—Thuong T Nguyen
(74) *Attorney, Agent, or Firm*—Novak Druce + Quigg

(57) ABSTRACT

A method for presenting portlets within a portal can include providing a portal including a multitude of portlets, each portlet having at least one presentation attribute. A context in which access to the portal is requested can be identified and particular ones of the presentation attributes can be selected according to the context. Based upon selected presentation attributes, a presentation order can be determined for the portlets.

16 Claims, 3 Drawing Sheets

CONTEXT SENSITIVE PORTLETS

BACKGROUND OF THE INVENTION

1. Technical Field

The present invention relates to the field of software and, more particularly, to Web portals.

2. Description of the Related Art

Many Web sites utilize portals, which are anchor Web pages used as entry points or gateways to network accessible information. The Web in its broadest sense being the universe of network-accessible information including the resources and users on the Internet which are communicatively linked via the Hypertext Transfer Protocol (HTTP) and related protocols. In this context, a portal can include one or more containers, called portlets, within which externally derived content can be placed. The external data is often a segment of markup extracted from an external Web page and accessed via an Internet link.

Portals can have the ability to present information in a variety of formats, each format targeted for a particular context. For example, if a Web browser is accessing a portal, the portal can present information as an HTML (hypertext markup language) document. Alternately, if a Web-enabled personal data assistant (PDA) is accessing a portal, the portal can present information as a WML (wireless markup language) document. Similarly, a portal with voice access capabilities can audibly present information from a VoiceXML extensible document or other voice enabled markup document.

Conventional portals are generally optimized for visual presentations using a Web browser of a personal computer. When such portals are formatted for a different context, a cumbersome and/or confusing presentation can result. For example, content presented through an audio interface commonly is presented in the same order and/or manner as when the content is presented through a visual interface. More specifically, conventional portals audibly present portlets from left-to-right and from top to bottom. Further, tables and other structures within portlets are typically accessed columns first from left-to-right and then by row from top-to-bottom.

Additionally, particular portals may not be renderable for all contexts. For instance, a portlet containing a video may be properly rendered in a personal computer (PC) context but not properly rendered in a mobile context. Further, users accessing the portal in a voice context, such as a telephone, should not be presented with visually oriented portlets.

Presently, no portal framework exists which allows a portal administrator to specify different presentation attributes, such as order and/or enablement, in a context specific manner. One possible solution to providing context-dependent Web pages has been to construct multiple portals, each tailored for a particular context. This solution is costly as each of these portals has an associated development and maintenance cost, which can be substantial.

SUMMARY OF THE INVENTION

The invention disclosed herein provides a method, a system, and an apparatus for context sensitive portlets. In particular, various contexts or access channels can be identified. For example, a personal computer (PC) context can be identified for accessing the portal from the Web using a computer, a voice context can be identified for accessing the portal from a telephone, and a mobile context can be identified for accessing the portal from a personal data assistant (PDA) or Web-equipped cellular telephone. Numerous portlets can then be selected for inclusion within a portal. Context specific presentation attributes, such as presentation order and enablement, can then be selectively associated with particular ones of the various portlets. As a result, one set of presentation attributes can be associated with a first context, such as a PC context, and a second set of presentation attributes can be associated with a second context, such as a voice context. Thus, the particular information delivered as well as the manner in which that information is delivered can be controlled according to the context through which it is accessed.

One aspect of the present invention includes a method for presenting portlets within a portal including providing a portal including a plurality of portlets, each portlet having at least one presentation attribute. A context in which access to the portal is requested can be identified. For example, the context can be based at least in part upon a target markup language. In another example, the capabilities of the hardware accessing the portal can be determined from information contained within a user information request and context can be based at least in part upon the hardware capabilities. In yet another example, the context can be based at least in part upon a user category of a user accessing the portal.

Particular ones of the presentation attributes can be selected according to the determined context. A presentation order can be determined based upon the selected presentation attributes. Further, in one embodiment, a presentation order for a plurality of structures within one of the portlets can be determined based upon selected presentation attributes. Additionally, particular ones of the portlets can be enabled based upon the selected presentation attributes. Moreover, particular ones of the structures can be enabled based upon selected presentation attributes.

In one embodiment, the presentation order and the enablement of the portlets can be based upon a numbering scheme, wherein each context has different associated minimum and maximum numbers. In another embodiment, a multitude of portlet types can be defined, wherein a set of definable presentation attributes can be associated with each portlet type. In yet another embodiment, at least one of the presentation attributes for a selected context can be administratively modified via an interface.

Another aspect of the present invention can include a portal with a plurality of portlets. Each portlet can have at least one context-dependant enabling parameter and/or a context-dependant ordering parameter. The context-dependant enabling parameter can selectively determine for a defined context whether the associated portlet is enabled within the portal. The context-dependant ordering parameter can selectively determine for a defined context a presentation order of the associated portlet within the portal.

BRIEF DESCRIPTION OF THE DRAWINGS

There are shown in the drawings embodiments, which are presently preferred, it being understood, however, that the invention is not limited to the precise arrangements and instrumentalities shown.

DETAILED DESCRIPTION OF THE INVENTION

The invention disclosed herein provides a method, a system, and an apparatus for providing context sensitive portlets. Various portlets can be selected for presentation within a portal. Each of these portlets can contain context specific presentation attributes. A context can be an access channel through which a portal is accessed. A presentation attribute can be any presentation defining parameter, such as enablement or presentation order. When a user attempts to access the portal, a context is determined. Presentation attributes associated with the selected context are then identified and used during portal presentation.

Figure 1:
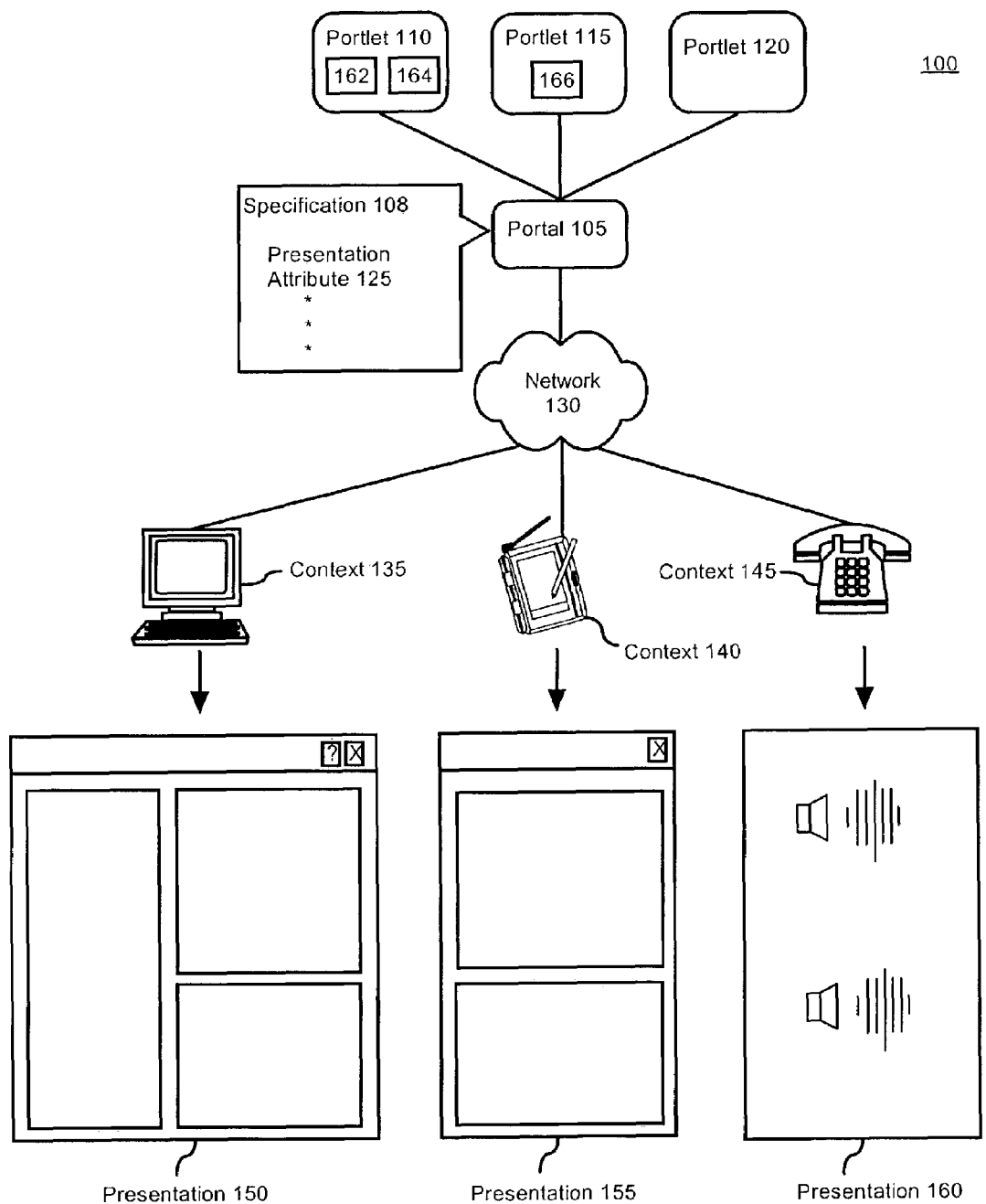
FIG. 1 is a schematic diagram illustrating a system including context sensitive portlets.

FIG. 1 is a schematic diagram illustrating a system 100 including context sensitive portlets. System 100 can include a portal 105, portlets 110, 115, and 120, contexts 135, 140, and 145, and presentations 150, 155, and 160. The portal 105 can be a Web site that contains data aggregated from various sources. More specifically, the portal 105 can selectively provide different Web pages to requesters. These Web pages can be either dynamically or statically constructed.

In one embodiment, the portal 105 can be generated using a portal construction application. The portal construction application can provide a framework that provides an administrator a customized environment, which can be used to quickly define Web pages. The portal construction application can allow for the selection of various portlets, such as portlets 110, 115, and 120. Additionally, the portal construction application can define the portal 105 by using a portal specification 108.

In another embodiment, the portal 105 can be directly defined by markup. Markup refers to the sequence of characters or other symbols that can be inserted at certain places in an electronic document to indicate how the electronic document should look or sound when the document is printed, displayed, or otherwise presented. Numerous standard markup languages exist that include, but are not limited to, HTML (Hypertext Markup Language), XML (Extensible Markup Language), VoiceXML, SGML (Standard Generalized Markup Language), WML (Wireless Markup Language), and the like.

The portal specification 108 can specify portlets 110, 115, and 120; a portlet being a display unit within the portal 105 that contains externally derived data, such as data from a Web page other than the portal 105. Each portlet can correspond to a Web site different than the Web site represented by the portal 105. Moreover, a portlet providing Web site can provide a plurality of portlets to the portal 105. Additionally, portlets 110, 115, and 120 can include numerous structures, such as structures 162, 164, and 166.

Structures 162, 164 and 166 can be descriptors definable by a markup tag or tags. Structures 162, 164 and 166 can have an opening tag and a closing tag that indicate the scope of the respective structure. For example, structure 162 can be a table row structure that is described by the tags <TR> and </TR>, where markup occurring between the tags is contained within the table row.

The portal 105, the portlets 110, 115, and 120, and the structures 162, 164, 166, can each have various presentation attributes 125. A presentation attribute 125 can be a parameter defining a manner in which information is presented. Presentation order and enablement are two presentation attributes 125 that can be associated with both portlets 110, 115, and 120 as well as structures 162, 164, and 166. The invention, however, is not restricted to just those two presentation attributes and others are contemplated. For example, presentation attributes 125 can include such visual attributes as navigational order (which can be different from presentation order), visible (which can be different from enablement), color, size, position, text size, text style, text language, vocal language, vocal pace, vocal volume, and vocal style. Different presentation attributes 125 can be associated with different contexts, such as context 135, 140, and 145.

The contexts 135, 140, and 145 can represent particular access channels. Linking different presentation attributes 125 to different contexts can optimize a presentation of the portal 105 for a particular context. In one embodiment, context can refer to a marketing methodology or a sales channel. For example, contexts can include a Web channel for external PC access, an in-store or kiosk channel, a direct marketing channel, and/or a telemarketing channel. The contexts 135, 140, and 145 can also represent various accessing protocols associated with diverse hardware. For example, contexts can include a personal computer (PC) context, a voice context, and a mobile context.

In another embodiment, contexts 135, 140, and 145 can represent different underlying markup. For example, contexts can include an XML context, a WML context, an HTML context, and a VoiceXML context. Associating different presentation attributes 125 with different contexts in this embodiment, can be beneficial as each markup language can have different benefits and limitations for which the portal 105 can be optimized.

In yet another embodiment, the contexts 135, 140, and 145 can represent different user categories. User categories can be based on skill level, such as novice, intermediate, and expert. User categories can also be based on user access level, such as customer, employee, and administrator. Alternatively, user categories can be based upon membership status, purchasing habits, and/or established preferences.

The presentations 150, 155, and 160 can be any of a variety of presentation methods including audio and/or visual displays. Additionally, the presentations 150, 155, and 160 can be hardware and/or software dependant. Presentation hardware can include such devices as computers, personal data assistants, and telephones. Software can include various browsers, word processing applications, and any other application capable of presenting the portal 105.

In operation, in one embodiment, a user of a computer system can attempt to access the portal 105 via a network 130. The computer system can be associated with the context 135. The portal 105 can responsively convey a Web page based upon the specification 108 to the user. The conveyed Web page can then be appropriately presented to a user or requestor. For example, context 135 can result in presentation 150, context 140 can result in presentation 155, and context 145 can result in presentation 160. That is, content derived from a common source, i.e. the portal 105, can be presented in numerous manners depending upon the channel over which the content is to be provided.

Figure 2:
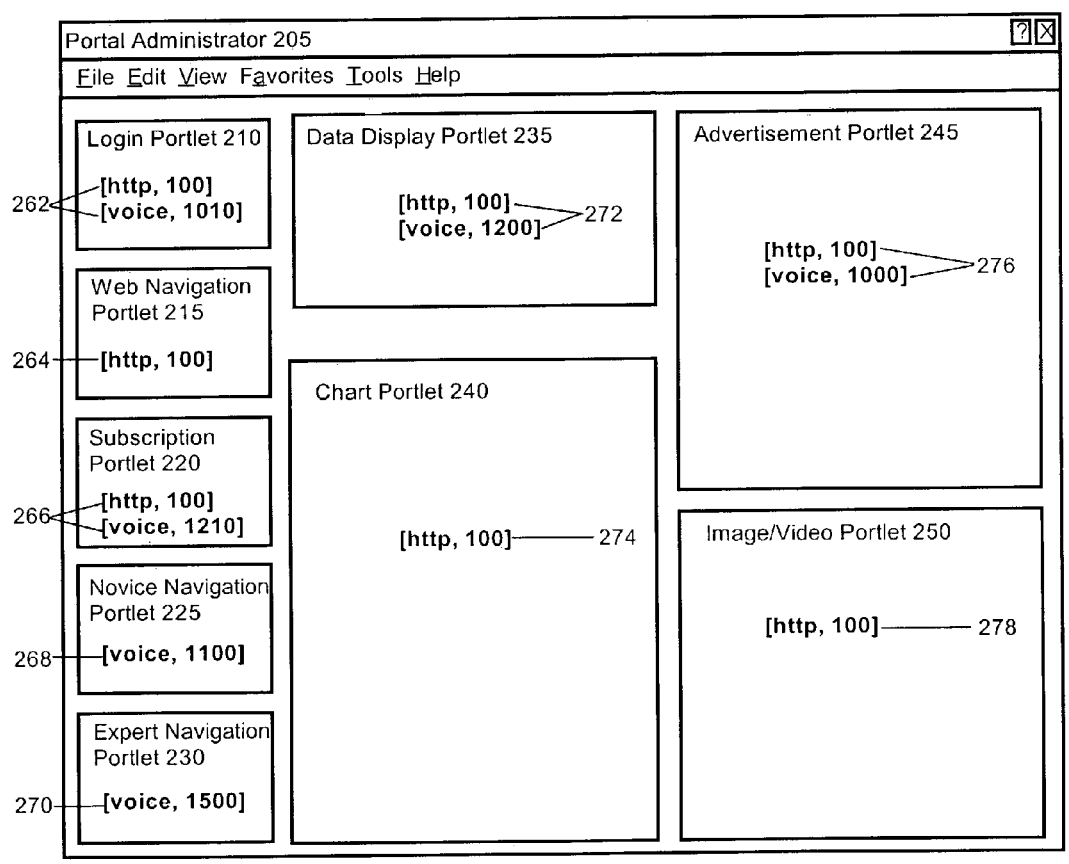
FIG. 2 is a schematic diagram of an exemplary system for administrating context-sensitive portals.

FIG. 2 is a schematic diagram of an exemplary system 200 for administrating context-sensitive portals. System 200 provides an interface for quickly designing portals with customized, context sensitive portlets based upon presentation attributes. Two different contexts, a Hypertext Transfer Protocol (HTTP) context and a voice context, are specified within the presentation attributes defined within system 200. The HTTP context represents the situation where portal access occurs via a HTML browser of a personal computer. The voice context represents the situation where portal access occurs via a voice system, such as a telephone. For example, content can be provided to a voice server to be provided over a circuit switched or packet switched network to a telephony device and/or audio interface.

The portal administrator 205 provides an interface with which administrators can specify presentation attributes for various contexts. More specifically, the portal administrator 205 provides a portal application framework that allows an administrator to quickly define a Web page layout with context-sensitive portals. The portal administrator 205 can selectively associate various portlets with specific contexts. For example, the portal administrator 205 can enable an administrator to selectively identify which portlets will be available in the HTTP context and enable the administrator to determine the presentation order for available portlets. The presentation order can include the order in which visible and/or audible content is presented. Moreover, visual order can signify the on-screen presentation arrangement of portlets relative to the portal as displayed within a visual browser.

System 200 includes a login portlet 210, a Web navigation portlet 215, a subscription portlet 220, a novice navigation portlet 225, an expert navigation portlet 230, a data display portlet 235, a chart portlet 240, an advertisement portlet 245, and an image/video portlet 250. Appreciably, the invention can be utilized with any portlets of any nature and is not limited to applications including the exemplary portlets.

As shown in FIG. 2, login portlet 210 provides an interface for a user login. Login portlet 210 can be used to prompt the user for security information and responsively perform appropriate authentication and authorization for the user. As defined by presentation attributes 262, login portlet 210 can be utilized in both the HTTP and the voice contexts.

Web navigation portlet 215 provides an interface for users to navigate to various predefined Web sites. As defined by presentation attributes 264, web navigation portlet 215 can only be utilized in the HTTP context, since some Web navigation information does not translate well to the voice context.

Subscription portlet 220 provides an interface for a user to subscribe to various information sources. For example, using subscription portlet 220, a user can subscribe to a stock market service, local weather, and various news providing services. Subscription portlet 220 can be utilized in both the HTTP and the voice contexts based upon presentation attributes 266.

Novice navigation portlet 225 provides an interface for a novice user. The interface of 225 contains extensive prompting helpful to a user unfamiliar with the accessed portal. Similarly, expert navigation portlet 230 provides an interface for an expert user. Expert navigation portlet 230 can exclude many of the prompts that are unnecessary for an experienced user. Moreover, expert navigation portlet 230 and can add new features that would confuse a novice user but be welcomed by an experienced user. Novice navigation portlet 225 and expert navigation portlet 230 are configured for the voice context, as indicated by presentation attributes 268 and 270. Appreciably, the invention is easily extended to additional experience level gradients, which are not illustrated in system 200. Consequently, the appropriate navigation portlet can be selectively displayed according to an identified user class.

Data display portlet 235 provides a general information presentation interface capable of receiving data from back-end systems. Data display portlet 235 can be utilized in both the HTTP and the voice contexts as indicated by presentation attributes 272.

Chart portlet 240 provides a graphical interface in which charts and graphs can be presented. Since charts and graphs need to be visually presented, chart portlet 240 is not applicable in a voice context. Accordingly, presentation attributes 274 specifies that chart portlet 240 can only be used in the HTTP context.

Advertisement portlet 245 provides an interface for presenting advertising. Advertising portlet 245 can be helpful in supporting a portal through advertising revenue and can, but need not, utilize direct marketing information. As specified by presentation attributes 276, advertising portlet 245 can be utilized in both the HTTP and the voice contexts.

Image/video portlet 250 provides a graphical interface in which pictures, clip art, graphics, and video can be presented. Image/video portlet 250 can be utilized in the HTTP context but not in the voice context, as indicated by presentation attributes 278.

The presentation attributes 262, 264, 266, 268, 270, 272, 274, 276, and 278 defined in system 200 all have numeric values. In FIG. 2, the number "100" represents a default value. Other values can be compared against a minimum value and a maximum value, specified at run time for a particular situation. Portlets with a presentation attribute value between the minimum and maximum values will be presented in numerical order. Portlets outside the minimum and maximum values will not be presented. User responses can cause the minimum and maximum values to change, resulting in different portlets being presented.

In operation, a request for the portal defined by the portal administrator 205 can received. The context of the request can be determined by examining parameters within the request, such as by examining a HTTP header and/or a Uniform Resource Locator (URL) of the request. In this example, it can be determined that the context is the HTTP context. A minimum numeric value of "0," a maximum numeric value of "500," and a default value of "100" can exist for the HTTP context. The presentation attributes within each portlet can be individually examined for the HTTP context using the maximum, minimum, and default values.

For example, the novice navigation portlet 225 and expert navigation portlet 230 have no presentation attributes defined for the HTTP context. Accordingly, neither the navigation portlet 225 nor the expert navigation portlet 230 are to be included in the portal specification for the HTTP context. Further, portlets 210, 215, 220, 235, 240, 245, and 250 each have a presentation attribute of "100" for the HTTP context, which is the default value. Since the default value is between the minimum and maximum numeric values established for the HTTP context and since no other presentation values are defined for the HTTP context, portlets 210, 215, 220, 235, 240, 245, and 250 can be visually presented in default order, which is the order in which each portlet appears within the portal administrator 205. Accordingly, a Web page for a portal including portlets 210, 215, 220, 235, 240, 245, and 250 can be dynamically constructed and sent to the requestor.

In another example, the portal server can determine that the context is the voice context. The voice context can have a minimum numeric value of "500," a maximum numeric value of "1050," and a default value of "1100." In the example, the portal server can initially search for any portlets with presentation attributes between "500" and "1050." If no portlets are found between the minimum and maximum numeric values, those portlets with the default value can be presented. In system 200, login portlet 210 and advertisement portlet 245 have a presentation attribute value between the minimum and maximum value. Since advertising portlet 245 has a lower presentation attribute value than login portlet 210, advertising portlet 245 can be presented first. Accordingly, audible advertising can be presented to a requestor followed by an audible login prompt.

After receiving the login prompt, a requestor can audibly respond. Based on the response, the minimum and maximum numeric values for the voice context can be dynamically adjusted. For example, the response can indicate the requestor is an authorized novice causing the minimum numeric value to be adjusted to "1100" and the maximum numeric value to be adjusted to "1250." Thereafter, that novice navigation portlet 225 with a presentation attribute of "1100," data display portlet 335 with a presentation attribute of "1200," and subscription portlet 220 with a presentation attribute of "1210" can be presented in order. Notably, different audible responses from the user can result in different values established for minimum and maximum numeric values depending on software triggers established using the portal administrator 205.

Figure 3:
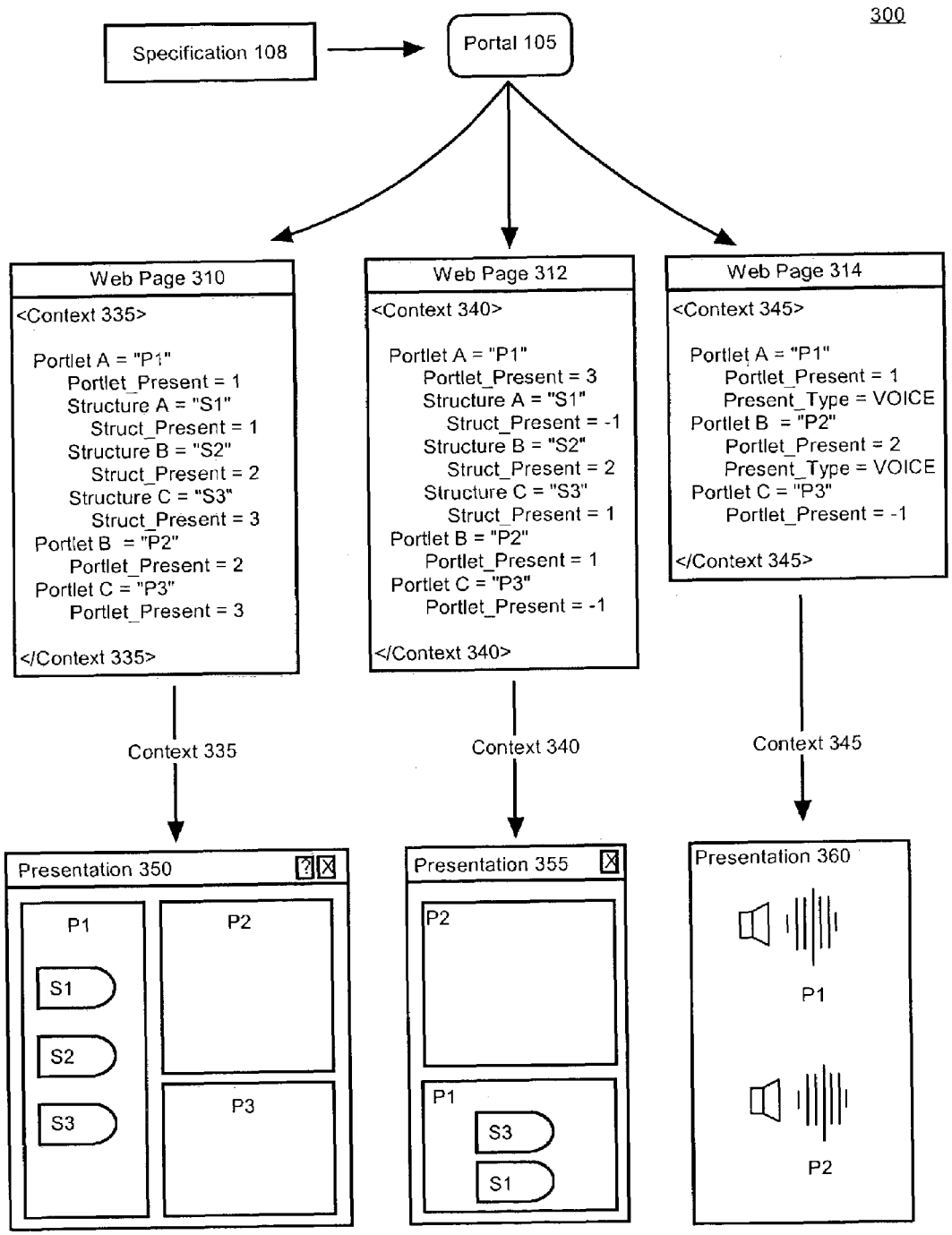
FIG. 3 is a schematic diagram illustrating a system using the context sensitive portlets of FIG. 1.

FIG. 3 is a schematic diagram of a system 300 for providing context sensitive portlets. System 300 can include a portal 105, Web pages 310, 312, and 314, and presentations 350, 355, and 360. The portal 105 can contain aggregated data from external sources as previously defined. The portal 105 can dynamically or statically generate context-sensitive Web pages 310, 312, and 314 from a common specification 108. The Web pages 310, 312, and 314 can be conveyed to a requester resulting in presentations 350, 355, and 360. For example, Web page 310 can be conveyed in context 335, Web page 312 can be conveyed in context 340, and Web page 314 can be conveyed in context 345. Available options for formatting Web pages 310, 312, and 314 can depend upon the capabilities of the Web server hosting the portal 105.

To fully understand the exemplary implementation of context sensitive portlets detailed in system 300, a number of conventions should be explained. In system 300, "Portlet_Present" represents a presentation attribute assigned to a portlet. "Struct_Present" represents a presentation attribute assigned to a structure. Both "Portlet_Present" and "Struct_Present" attributes are assigned numeric values. In this case, a negative numeric value indicates that the associated object should not be enabled. A positive value indicates the presentation order (from low to high). Finally, "Present_Type" is a presentation attribute depicting a type of rendering. The default "Present_Type" is VISUAL to which objects with an unspecified "Present_Type" default. Objects with a "Present_Type" of "VOICE" are to be presented to a computing system with text-to-speech capabilities to be ultimately presented to the requestor. For example, the computing system can be a voice access server communicatively linked to a voice gateway, which can be communicatively linked to the requester through telephony equipment. Finally, each portlet and structure is assigned a name designator, such as "P1," "P2", "P3", "S1", "S2", and "S3."

Using the above conventions, the derivation of presentations 350, 355, and 360 from Web pages 310, 312, and 314, respectively, can be described. Presentation 350, as specified by Web page 310, presents portlets in the order "P1," "P2," and "P3" according to the "Portlet_Present" variables 1, 2, and 3 respectively. Similarly, structures within "P1" are presented in the order "S1," "S2," and "S3" accordingly to the "Struct_Present" variables 1, 2, and 3 respectively. Consequently, presentation 350 results from Web page 310.

Turning to presentation 355, "S2" and "P3", as defined by Web page 312, have presentation attribute values of "−1" indicating that "S2" and "P3" should not be presented. Therefore, neither "S2" nor "P3" are presented within presentation 355. The presentation order of the remaining portlets and structures within presentation 355 is based on the numeric value of the respective presentation attributes. Consequently, as defined by Web page 312, "P2" is presented before "P1" and "S3" presented before "S1."

Finally, Web page 314 specifies that "P1" and "P2" have a "Present_Type" of "VOICE." Accordingly, portlets "P1" and "P2" are audibly presented within presentation 360. Since structures "S1," "S2," and "S3" are not defined in Web page 314, none of the structures are included within presentation 360. Additionally, "P3" is not presented within presentation 360 because of the associated "portlet present" value of "−1."

It should be noted that Web page 314 can be a voice enabled markup document, which can be presented to a voice server or a speech browser for rendering. Accordingly, a user of a telephony device, such as a telephone, can contact the voice server, which in turn contacts the portal 105. The Web page 314 can be responsively conveyed from the portal 105 to the voice server and converted into a sequence of audio signals. Each of these audio signals can be selectively presented to the user via telephony hardware.

As used herein, Web pages 310, 312, and 314 are to be liberally construed to represent any electronically conveyable 'document'. Accordingly, Web pages 310, 312, and 314 need not be written in a particular markup but can represent any context specific specification resulting in presentations 350, 355 and 360. Additionally, the structures and presentation attributes defined within the Web pages 310, 312, and 314 are for illustrative purposes only and are not to be literally interpreted. For example, Porlet_Present represents a generic attribute described in functional terms. When implemented, the Web pages 310, 312, and 314 that the portal 105 conveys should to be written in a fashion so that unmodified, conventional browsers can interpret them. In other words, no client-side applications or plug-ins are necessary in order to render presentations 350, 355, and/or 360.

One of ordinary skill in the art, should appreciate, that the examples expressed by systems 200 and 300 are two of many possible configurations contemplated by the present invention. Accordingly, systems 200 and 300 are shown for illustrative purposes only and are not intended as a limitation of the present invention.

Further, the present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A computer-implemented method for presenting portlets within a portal based on a context accessing the portal, the method comprising the steps of:
   providing a portal including a plurality of portlets;
   providing a plurality of sets of presentation attributes, each set of presentation attributes including a presentation-enabling parameter defining portlets to be enabled and a presentation-ordering parameter defining a presentation order of the enabled portlets;
   associating a specific context accessing the portal with a specific set of presentation attributes, wherein the context is associated with specific devices used by a user to access the portal;
   identifying a context in which access to said portal is requested, wherein said context indicates one of a plurality of different access channel types, the access channel types comprising a visual channel for delivering visual presentations and an audible channel for delivering audible presentations, said identifying step including:
      based upon information contained within a user information request to access said portal, determining capabilities of a device used to access said portal, the information indicating a type of the device; and
      determining said context based at least in part upon said determined capabilities of the device;
   selecting a particular set from the plurality of sets of presentation attributes according to said context;
   based upon the selected set of presentation attributes, determining particular ones of the portlets to be enabled and presented and a presentation order of the enabled portlets; and
   delivering the enabled portlets in the presentation order to a device associated with the context accessing the portal;
   wherein said presentation order and said enablement of said portlets are based upon said selected presentation attributes, wherein said selected presentation attributes are each assigned a number according to a predetermined numbering scheme that establishes a low and a high of the presentation order, and wherein each context has different associated minimum and maximum numbers.

2. The method of claim 1, further comprising the step of:
   based upon selected presentation attributes, determining the low to the high presentation order for a plurality of structures within one of said portlets.

3. The method of claim 2, further comprising the step of:
   based upon selected presentation attributes, determining particular ones of said structures to enable.

4. The method of claim 1, wherein said identifying step further comprises the step of:
   determining said context based at least in part upon a target markup language.

5. The method of claim 1, wherein said identifying step further comprises the step of:
   determining said context based at least in part upon a user category of a user accessing said portal.

6. The method of claim 1, further comprising the step of:
   establishing a plurality of portlet types, wherein a set of definable presentation attributes is associated with each portlet type.

7. The method of claim 1, further comprising the step of:
   administratively modifying at least one of said presentation attributes for a selected context via an interface.

8. A computer-implemented portal in which portlets are presented based on a context accessing the portal, comprising:
   a plurality of portlets;
   wherein a plurality of sets of presentation attributes are provided, each set of presentation attributes including a presentation-enabling parameter defining portlets to be enabled and a presentation-ordering parameter defining a presentation order of the enabled portlets, each set of presentation attributes being associated with a specific context accessing the portal, the context being associated with specific devices used by a user to access the portal, the context indicating one of a plurality of different access channel types, the access channel types comprising a visual channel for delivering visual presentations and an audible channel for delivering audible presentations;
   wherein upon selecting a particular set from the plurality of sets of presentation attributes according to a context accessing the portal, particular ones of the portlets to be enabled and presented and a presentation order of the enabled portlets are determined, and the enabled portlets are delivered in the presentation order to a device associated with the context accessing the portal;
   wherein capabilities of a device used to access the portal are determined based upon information contained within a user information request to access the portal, the information indicating a type of the device, and the context is determined based at least in part upon the determined capabilities of the device; and
   wherein said presentation order and said enablement of said portlets are based upon said selected presentation attributes, wherein said selected presentation attributes are each assigned a number according to a predetermined numbering scheme that establishes a low and a high of the presentation order, and wherein each context has different associated minimum and maximum numbers.

9. A computer-implemented system for presenting portlets within a portal based on a context accessing the portal, comprising:
   means for providing a portal including a plurality of portlets;
   means for providing a plurality of sets of presentation attributes, each set of presentation attributes including a presentation-enabling parameter defining portlets to be enabled and a presentation-ordering parameter defining a presentation order of the enabled portlets;
   means for associating a specific context accessing the portal with a specific set of presentation attributes, wherein the context is associated with specific devices used by a user to access the portal;
   means for identifying a context in which access to said portal is requested, wherein said context indicates one of a plurality of different access channel types, the access channel types comprising a visual channel for delivering visual presentations and an audible channel for delivering audible presentations;
   means for selecting a particular set from the plurality of sets of presentation attributes according to said context;
   means for, based upon the selected set of presentation attributes, determining particular ones of the portlets to be enabled and presented and a presentation order of the enabled portlets; and
   means for delivering the enabled portlets in the presentation order to a device associated with the context accessing the portal;

wherein capabilities of a device used to access the portal are determined based upon information contained within a user information request to access the portal, the information indicating a type of the device, and the context is determined based at least in part upon the determined capabilities of the device; and wherein said presentation order and said enablement of said portlets are based upon said selected presentation attributes, wherein said selected presentation attributes are each assigned a number according to a predetermined numbering scheme that establishes a low and a high of the presentation order, and wherein each context has different associated minimum and maximum numbers.

10. A machine-readable storage having stored thereon, a computer program having a plurality of code sections, said code sections executable by a machine for causing the machine to perform the steps of:

providing a portal including a plurality of portlets;

providing a plurality of sets of presentation attributes, each set of presentation attributes including a presentation-enabling parameter defining portlets to be enabled and a presentation-ordering parameter defining a presentation order of the enabled portlets;

associating a specific context accessing the portal with a specific set of presentation attributes, wherein the context is associated with specific devices used by a user to access the portal;

identifying a context in which access to said portal is requested, wherein said context indicates one of a plurality of different access channel types, the access channel types comprising a visual channel for delivering visual presentations and an audible channel for delivering audible presentations, said identifying step including:

based upon information contained within a user information request to access said portal, determining capabilities of a device used to access said portal, the information indicating a type of the device; and determining said context based at least in part upon said determined capabilities of the device;

selecting a particular set from the plurality of sets of presentation attributes according to said context;

based upon the selected set of presentation attributes, determining particular ones of the portlets to be enabled and presented and a presentation order of the enabled portlets; and delivering the enabled portlets in the presentation order to a device associated with the context accessing the portal;

wherein said presentation order and said enablement of said portlets are based upon said selected presentation attributes, wherein said selected presentation attributes are each assigned a number according to a predetermined numbering scheme that establishes a low and a high of the presentation order, and wherein each context has different associated minimum and maximum numbers.

11. The machine-readable storage of claim 10, further comprising the step of:

based upon selected presentation attributes, determining a low to a high presentation order for a plurality of structures within one of said portlets.

12. The machine-readable storage of claim 11, further comprising the step of:

based upon selected presentation attributes, determining particular ones of said structures to enable.

13. The machine-readable storage of claim 10, wherein said identifying step further comprises the step of:

determining said context based at least in part upon a target markup language.

14. The machine-readable storage of claim 10, wherein said identifying step further comprises the step of:

determining said context based at least in part upon a user category of a user accessing said portal.

15. The machine-readable storage of claim 10, further comprising the step of:

establishing a plurality of portlet types, wherein a set of definable presentation attributes is associated with each portlet type.

16. The machine-readable storage of claim 10, further comprising the step of:

administratively modifying at least one of said presentation attributes for a selected context via an interface.

* * * * *